United States Patent [19]

Abe et al.

[11] 4,124,003
[45] Nov. 7, 1978

[54] IGNITION METHOD AND APPARATUS FOR INTERNAL COMBUSTION ENGINE

[75] Inventors: Michio Abe, Kasugai Aichi; Naoyuki Maeda, Inyuama, both of Japan

[73] Assignee: Tokai TRW & Co., Ltd., Kasugai Aichi, Japan

[21] Appl. No.: 732,971

[22] Filed: Oct. 15, 1976

[30] Foreign Application Priority Data

Oct. 23, 1975 [JP] Japan .................................. 50/127841
Mar. 19, 1976 [JP] Japan .................................. 51/30311

[51] Int. Cl.² ........................ F02B 33/00; F02M 7/00; F02P 1/00
[52] U.S. Cl. ............................ 123/119 E; 123/169 R; 123/169 MG; 123/169 EL; 123/32 ST; 123/148 DS
[58] Field of Search ................ 123/169 MG, 169 EL, 123/169 R, 32 R, 119 E, 32 ST, 148 DS, 32 MD, 148 B

[56] References Cited

U.S. PATENT DOCUMENTS

| | | | |
|---|---|---|---|
| 2,093,339 | 9/1937 | Pippig | 123/119 E |
| 2,457,973 | 1/1949 | Blau | 123/169 EL X |
| 3,318,293 | 5/1967 | Hickling et al. | 123/119 E |
| 3,842,819 | 10/1974 | Atkins et al. | 123/169 MG |
| 3,949,718 | 4/1976 | Turner | 123/119 E |
| 3,974,412 | 8/1976 | Pratt, Jr. | 123/169 MG |
| 4,041,922 | 8/1977 | Abe et al. | 123/169 MG |

FOREIGN PATENT DOCUMENTS 773,700  5/1957  United Kingdom ............. 123/148 DS Primary Examiner—Wendell E. Burns

[57] ABSTRACT

An internal combustion engine ignition apparatus includes a secondary spark plug having a center electrode to which a high voltage is applied. A cylindrical peripheral electrode surrounds the center electrode and has peripheral openings. Upon the formation of a corona discharge due to the high voltage applied to the center electrode, a strong ionic wind and convection of an air-fuel mixture are produced. The ionic wind causes fuel constituents to be gathered in the vicinity of the peripheral electrode thus preventing production of hydrocarbons due to cooling or quenching of the fuel on the combustion chamber wall. Initial ignition of the air-fuel mixture is by means of a main spark plug. The resultant flames are propagated to the corona discharge portion of the secondary spark plug. The corona discharge is then changed to secondary continuous spark discharge, to thereby positively fire the stratified air-fuel mixture. In another embodiment of the invention the auxiliary combustion chamber has a generally spherical configuration. The spherical auxiliary combustion chamber wall directs the extremely lean air-fuel mixture along a relatively long arcuate path back to outer side areas of the entrance to the auxiliary combustion chamber. The flow out of the auxiliary combustion chamber of the extremely lean air-fuel mixture from which fuel particles have been electrostatically precipitated, is further promoted by forming secondary openings in the wall of the auxiliary combustion chamber. The flow of the very lean air-fuel mixture to either the main or secondary openings in the wall of the auxiliary combustion chamber may be still further promoted by forming arcuate grooves on the inside of the auxiliary combustion chamber wall. The establishment of a corona discharge in either a main or auxiliary combustion chamber is promoted by forming a central electrode with a plurality of projections which extend toward a peripheral electrode which circumscribes the central electrode.

8 Claims, 18 Drawing Figures

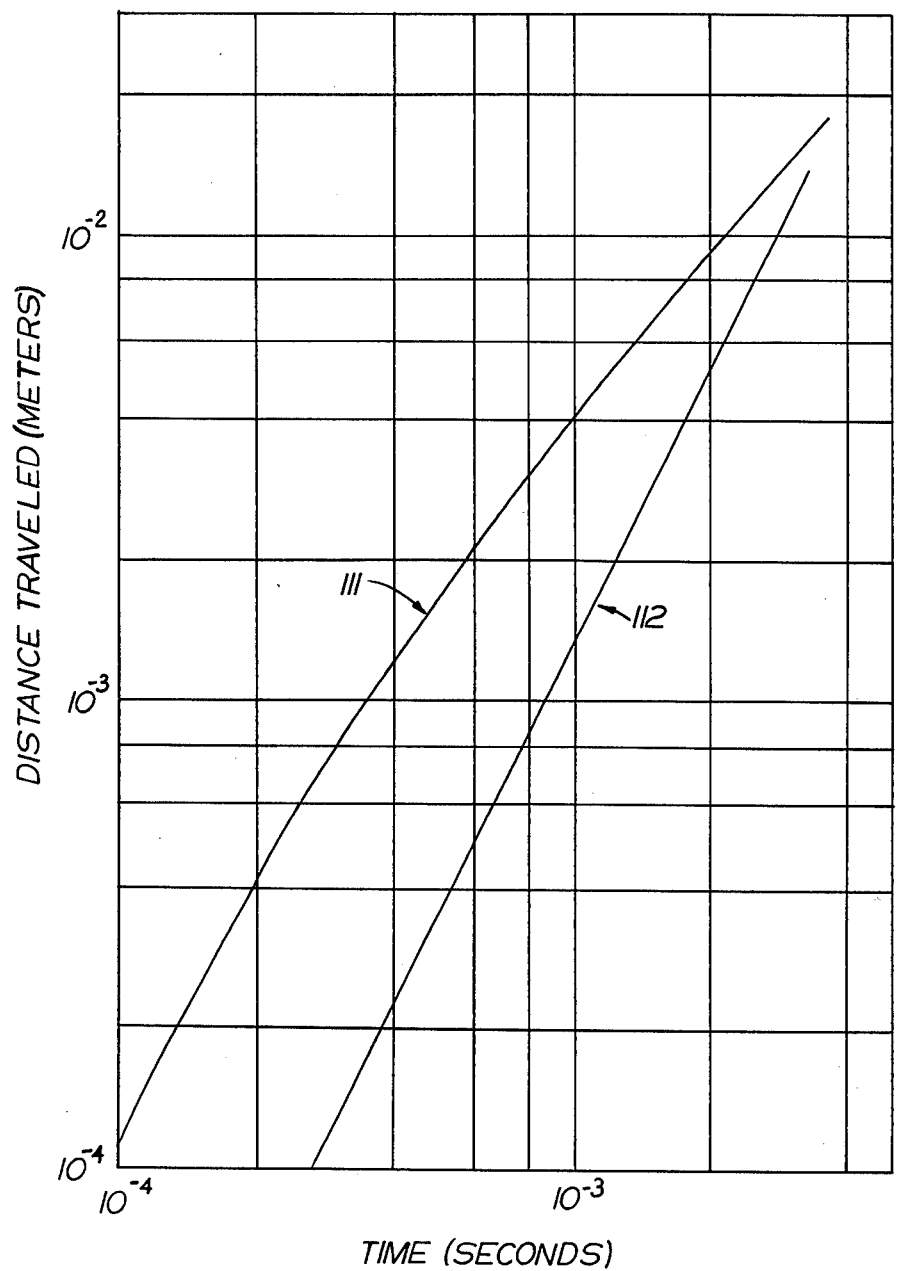

IGNITION METHOD AND APPARATUS FOR INTERNAL COMBUSTION ENGINE

BACKGROUND OF THE INVENTION

This invention relates to a method for igniting a lean mixture charge such as a gasoline or other fuel in a lean mixture charge type internal combustion engine, and a device therefor, to minimize to a greater extent the concentration of detrimental constituents in exhaust gases from the engine.

It is generally known that production of detrimental constituents such as CO, HC, NOX and so forth, in exhaust gases from an internal combustion engine is largely dependent upon the air-fuel ratio of the charge mixture. As a means of igniting a lean charge whose total air-fuel ratio is lower than a theoretical air-fuel ratio, it has been proposed that the charge be stratified under the influence of a corona discharge in a combustion chamber. The corona discharge ionizes fuel particles to collect a rich mixture in the vicinity of a spark plug. The apparatus for producing the corona discharge includes an electrode disposed in the vicinity of a spark gap in either a main combustion chamber or a subsidiary combustion chamber. A high voltage is impressed across the electrode and the combustion chamber wall, thereby producing a corona discharge between the tip of electrode and the inner wall of the combustion chamber.

The device described above is somewhat unsatisfactory in that electrically charged fuel particles are attracted to the wall of the combustion chamber in the vicinity of the electrode and cooled. Due to a well known quenching phenomenon, there is incomplete combustion of the relatively cool fuel particles attracted to the combustion chamber wall. This results in the exhausting of an undesirably large quantity of hydrocarbons.

An ignition method and a device for use in an internal combustion engine has been disclosed in Japanese patent applications Nos. 48-78009 (Public Disclosure No. 51-7309), 50-89549 and 50-127841, as well as in U.S. patent application No. 491,452 filed June 30, 1975 and entitled System and Device for the Ignition of an Internal Combustion Engine Using A Lean Air-Fuel Mixture. According to this ignition system, a relatively large D.C. voltage is impressed on a center electrode of a spark plug disposed within an auxiliary combustion chamber to cause a corona discharge. Fuel particles contained in an air-fuel mixture are electrostatically collected and atomized in the vicinity of the spark plug due to an electric field produced across the tip of the center electrode and a peripheral electrode surrounding the tip of said center electrode. This promotes stratification of the air-fuel mixture with a relatively rich mixture adjacent to the spark plug. The burning of the stratified charge is relatively efficient since the fuel particles are electrostatically attracted to the electrodes rather than the combustion chamber wall so that there is a minimal amount of quenching.

The advantages of the ignition method and apparatus of the aforesaid Japanese and United States patent applications has been proven by actual tests. The tests were carried out in a light van loaded with a four-cycle 1500cc engine. The engine had four-cylinders with wedge type cylinder heads. The van body weighed 2250 lbs. No antipollution devices were utilized other than the ignition method and apparatus disclosed in the aforesaid Japanese and United States patent applications.

In order to utilize the improved ignition method and device disclosed in the aforesaid Japanese and United States patent, internally threaded spark plug holes in the cylinder head were increased in diameter to 20mm. Members defining auxiliary combustion chambers having a spark plug therein were attached to the cylinder head at the enlarged spark plug holes. The spark plugs connected with the auxiliary combustion chambers had corona discharge center electrodes, cylindrical peripheral electrodes which surrounded the center electrodes, and spark ignition electrodes.

The tests were carried out in accordance with LA-4 modes set forth in EPA specification of United States and the test results are given in Table 1. For reference, there are shown the limits for LA-4 modes set forth in USA regulation and those set forth in California regulation which were in force in 1951, as well as the numerical values used in the light van prior to modification of the engine i.e., prior to installation of the improved ignition method and device disclosed in the aforesaid Japanese and United States patent applications.

TABLE 1

| Detrimental Constituents | US Limits * | California Limits * | Prior Art Engine | Improved Engine In Which the Invention of the Aforesaid patent applications was practiced |
|---|---|---|---|---|
| CO | 15 | 9 (5.0) | 12.7 | 7.8 |
| HC | 1.5 | 0.9(0.6) | 1.04 | 0.3 |
| Nox | 3.1 | 2.0(1.5) | 1.73 | 1.69 |
| Fuel consumption mile/gallon | | The numerical values in parenthesis are target values for 1981 | 23.1 | 27.0 |

*As of September, 1975
Remarks:
(1) The numerical values of gases are expressed in mile/gallon.
(2) In the case of an improved type engine, a mixture charge used was rendered leaner by adjusting a carburetor.

Table 1 clearly shows that, by adopting the ignition method and device according to the invention of the aforesaid Japanese and United States patent applications to an engine in which no antipollution measures are taken, the quantity of detrimental exhaust gases from the engine and fuel consumption are greatly reduced. However, the ignition method and device of the aforesaid Japanese and United States patent applications is not as effective on engines having a semi-spherical shaped combustion chamber. In addition, it should be noted that the quantity of exhaust gases from the improved engine is too large to meet the target values of United States EPA regulation for 1981.

SUMMARY OF THE PRESENT INVENTION

To reduce the quantity of exhaust gases to the United States EPA target values for 1981, it is necessary to properly select the position of a spark plug, configuration and volumes of a combustion chamber and/or auxiliary combustion chamber, and the carburetor mechanism. In addition, it is advantageous to utilize the same electrodes in the establishing of a corona discharge and a secondary spark. It is also advantageous to utilize auxiliary combustion chambers which promote the flow of an air-fuel mixture to and from the auxiliary combustion chamber.

An internal combustion engine ignition apparatus constructed in accordance with one embodiment of the present invention includes a secondary spark plug having a center electrode onto which a high D.C. voltage is applied. A cylindrical or truncated-conical peripheral electrode surrounds the center electrode and has peripheral openings. Upon the formation of a corona discharge due to the high voltage applied to the center electrode, a strong ionic wind and convection of an air-fuel mixture are produced. The ionic wind causes fuel constituents to be gathered in the vicinity of the peripheral electrode thus preventing production of hydrocarbons due to cooling or quenching of the fuel on the combustion chamber wall.

A main spark plug is located near the secondary spark plug. The primary ignition of the air-fuel mixture is by means of the main spark plug to ensure the firing of a relatively rich portion of the stratified air-fuel mixture. The resultant flames are propagated to the corona discharge portion of the secondary spark plug. The corona discharge is then changed to secondary continuous spark discharge, to thereby positively fire the stratified air-fuel mixture. This results in an accelerating flame propagation, whereby combustion efficiency is enhanced and the quantity of oxides of nitrogen and hydrocarbons is reduced.

In accordance with another feature of the present invention, the flow of a lean air-fuel mixture into an auxiliary chamber and the flow of a still leaner air-fuel mixture from the auxiliary combustion chamber to a main combustion chamber is promoted. To this end the auxiliary combustion chamber has a generally spherical configuration. A corona discharge is established between electrode surfaces which are offset from the center of the spherical auxiliary combustion chamber in a direction away from main opening to the auxiliary combustion chamber. The lean air-fuel mixture entering the auxiliary combustion chamber is electrostatically attracted toward the corona discharge. Fuel particles in the air-fuel mixture become ionized and adhere to the electrode surfaces. The extremely lean air-fuel mixture then flows outwardly away from the electrodes into engagement with the spherical inner surface of the auxiliary combustion chamber wall at locations disposed inwardly of the center of the auxiliary combustion chamber. The arcuate auxiliary combustion chamber wall directs the extremely lean air-fuel mixture along a relatively long arcuate path back to outer side areas of the entrance to the auxiliary combustion chamber. This flow path of the very lean air-fuel mixture from which particles of fuel have been electrostatically precipitated, promotes a flow of the somewhat richer air-fuel mixture from the main combustion chamber to the auxiliary combustion chamber.

The flow out of the auxiliary combustion chamber of the extremely lean air-fuel mixture from which fuel particles have been electrostatically precipitated, is further promoted by forming secondary openings in the wall of the auxiliary combustion chamber. The flow of the very lean air-fuel mixture to either the main or secondary openings in the wall of the auxiliary combustion chamber may be still further promoted by forming arcuate grooves on the inside of the auxiliary combustion chamber wall.

The establishment of a corona discharge in either a main or auxiliary combustion chamber is promoted by forming a central electrode with a plurality of projections. The projections on the central electrode extend toward a peripheral electrode which circumscribes the central electrode. By establishing a relatively high potential between the central and peripheral electrodes, a corona discharge is established between each of the plurality of projections and the peripheral electrode.

Accordingly, it is a feature of the present invention to provide a new and improved ignition method and device therefor in an internal combustion engine wherein stratification of a lean mixture charge is promoted and combustion efficiency is greatly enhanced.

Another feature of the present invention is to provide an improved ignition method and apparatus for an internal combustion engine in which the same two electrodes are utilized in establishing a corona discharge and then a spark discharge to promote stratification and subsequent ignition of a lean air-fuel mixture.

Another feature of the present invention is the provision of a new and improved internal combustion engine ignition method and apparatus wherein an air-fuel mixture is stratified by establishing a corona discharge at a secondary spark plug, initially igniting the stratified air-fuel mixture with a main spark plug disposed adjacent to the secondary spark plug, and promoting combustion of the air-fuel mixture by establishing a spark discharge at the secondary spark plug after initially igniting the air-fuel mixture with the main spark plug.

Another feature of the present invention is providing the peripheral electrode of a corona discharge spark plug with a truncated conical cylindrical shape and with a convergent bottom opening and more than a single opening in the peripheral side portion at a location higher than a level of the tip of the center electrode, so that convection of an air-fuel mixture in the vicinity of these electrodes is promoted, thereby facilitating collection of fuel at the peripheral electrode, with improved atomization and burning thereof.

Another feature of the present invention is the provision of a new and improved internal combustion engine ignition method and apparatus in which a corona discharge is established between a plurality of projections on a central electrode and a peripheral electrode which circumscribes the central electrode.

Another feature of the present invention is the provision of a new and improved internal combustion engine ignition method and apparatus in which a corona discharge is established in an auxiliary combustion chamber having a generally spherical configuration to promote a flow of an air-fuel mixture to and from the auxiliary combustion chamber through a main opening to the chamber.

Another feature of the present invention is the provision of a new and improved internal combustion engine ignition method and apparatus in accordance with the next preceeding feature and wherein secondary chamber openings are provided to facilitate a flow of an air-fuel mixture from the auxiliary combustion chamber.

Another feature of the present invention is the provision of a new and improved internal combustion engine ignition method and apparatus in accordance with either one of the next two preceeding features and wherein arcuate grooves are provided inside the auxiliary combustion chamber to direct the flow of the air-fuel mixture.

BRIEF DESCRIPTION OF THE DRAWINGS

The foregoing and other features of the present invention will become more apparent upon a consideration of the following description taken in connection with the accompanying drawings wherein:

FIG. 9 is a graph showing the relationship between the velocity and time of fuel particles of different sizes which are electrically charged and accelerated by an electrostatic field established by the corona discharge plug of FIG. 3;

DESCRIPTION OF SPECIFIC PREFERRED EMBODIMENTS OF THE INVENTION

Figure 1:
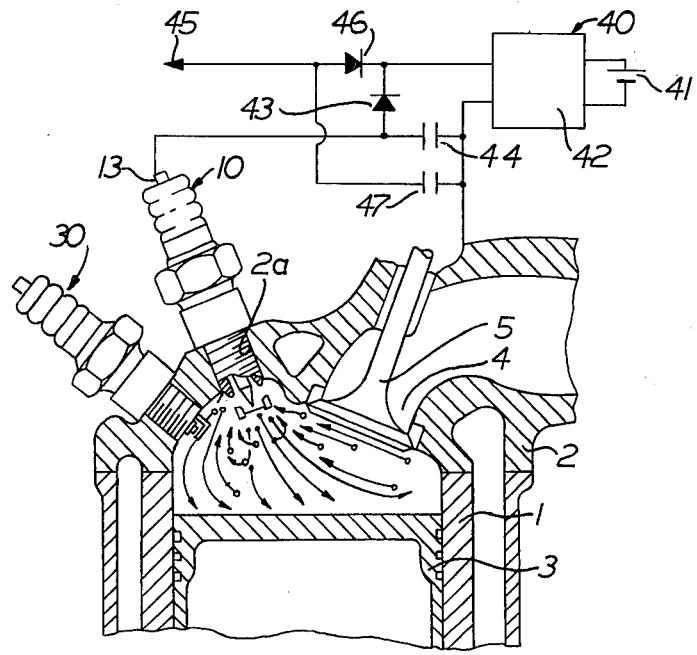
FIG. 1 is a fragmentary sectional view of one cylinder of an internal combustion engine having an ignition method and apparatus in accordance with the present invention, a corona discharge plug and a spark plug are disposed in a main combustion chamber.
Figure 2:
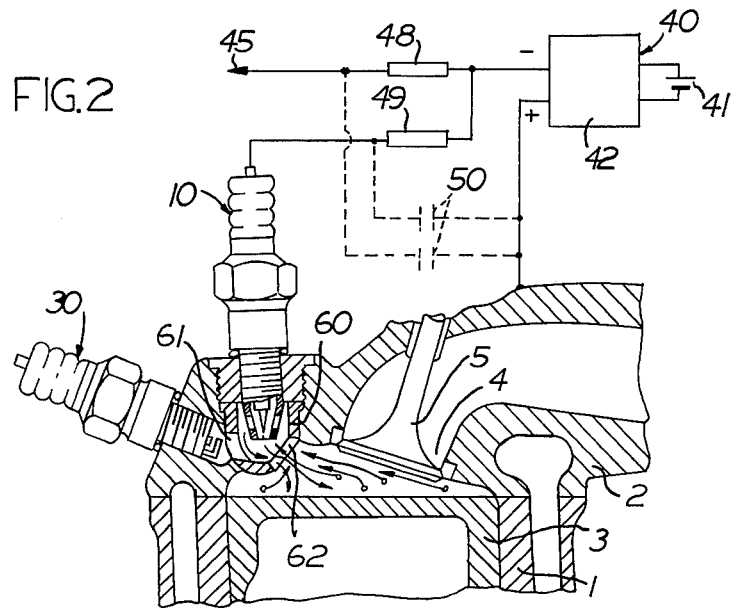
FIG. 2 is a fragmentary sectional view of one cylinder of an engine in which a corona discharge plug and spark plug are utilized in association with an auxiliary combustion chamber.

FIGS. 1 and 2 are examples of the present invention as practiced in a four-cycle, internal combustion engine, wherein shown at 1 is a cylinder, at 2 a cylinder head, at 3 a piston, at 4 an inlet port, and at 5 an inlet valve provided in the inlet port. Referring first to FIG. 1, a corona discharge or secondary plug 10 is disposed in the vicinity of the inlet port 4 in the cylinder head 2. A conventional spark or main plug 30 is attached to the cylinder head adjacent to the corona discharge plug 10. Connected to the corona discharge plug 10 is a high-voltage generating means 40 which will be referred to in detail hereinafter.

Figure 3:
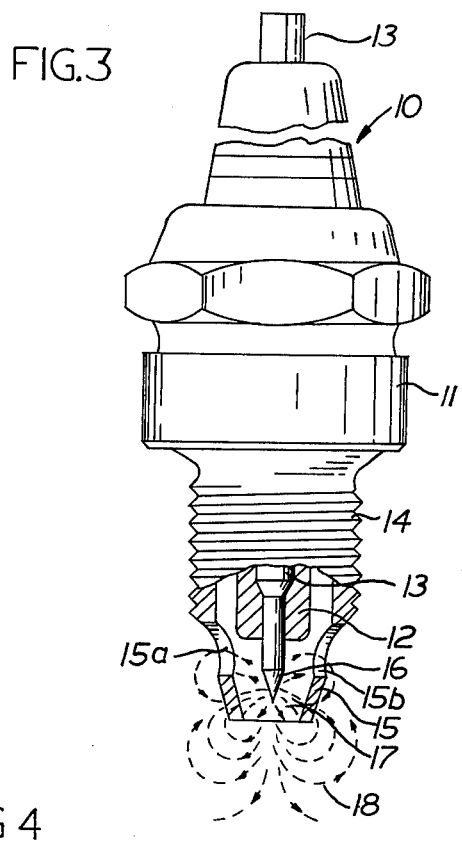
FIG. 3 is a fragmentary elevational view of a corona discharge plug constructed in accordance with the present invention and utilized in the engines of FIGS. 1 and 2.

The construction of the corona discharge plug 10 utilized in the engines of FIGS. 1 and 2 is shown in detail in FIG. 3. As is seen in FIG. 3, the secondary or corona discharge plug has a cylindrical peripheral electrode conductor 11 and a column-shaped center electrode conductor 13. The center electrode 13 is connected to the interior of the electrode conductor 11 in such a manner as to be electrically insulated therefrom by means of an electrically insulating material 12.

The peripheral electrode conductor 11 has a threaded portion 14 which is adapted to be threaded in a threaded hole 2a (FIG. 1) provided in the cylinder head 2. The metallic electrode conductor 11 is integrally formed with a cylindrical peripheral electrode 15 which is coaxial with the center electrode 13. The peripheral electrode 15 has a plurality of radially extending side openings 15a, 15b through which an air-fuel mixture flows under the influence of an electrostatic field established between the center electrode 13 and the peripheral electrode 15. The electrostatic field is illustrated schematically by the broken arrows in FIG. 3.

A stylus-shaped discharge portion 16 is provided at the lower portion of the center electrode 13. The stylus-shaped discharge portion 16 has a conical shape. The discharge portion 16 is disposed in a coaxial relationship with and is circumscribed by the annular outer electrode 15 to define an annular gap 17.

In accordance with one of the features of the present invention, the electrodes 13 and 15 are utilized in performing the dual functions of establishing a corona discharge to effect the electrostatic stratification of an air-fuel mixture and of establishing a secondary ignition spark to promote complete burning of an air-fuel mixture after it has been initially ignited. Therefore, the gap 17 serves as a corona discharging gap for producing an electrostatic field between the center electrode 13 and the peripheral electrode 15 and as a spark discharge gap between the two electrodes. The through-holes or openings 15a and 15b are provided in the periphery of the cylindrical peripheral electrode 15 to enable an air-fuel mixture to flow around the discharge portion 16. The number and a size of the openings are optional.

The high voltage generating means 40 (FIG. 1) includes a D.C. high voltage source 42 connected to a battery 41. Voltage at the battery voltage is raised by an oscillating, voltage-raising transformer (not shown). A negative voltage therefrom is impressed by way of a high voltage rectifier 43 on the center electrode of the corona discharge plug 10. The peripheral electrode 15 is grounded to the cylinder head 2 or another ground potential member. Although the embodiments shown are so arranged that a negative voltage is applied to the center electrode and a positive voltage is applied to the peripheral electrode, this arrangement may be reversed.

During operation of the engine, a negative voltage ranging from several thousand volts to more than ten thousand volts is applied to the center electrode 13. This voltage is sufficient to cause a corona discharge between the stylus-shaped electrode discharge portion 16 and the cylindrical outer electrode 15. Broken arrows in FIG. 3 represent distribution of the electrostatic field and lines of an electric force when the corona discharge is established.

Electrons from the corona discharge negatively ionize fuel constituents in the air-fuel mixture introduced into a main combustion chamber 1a formed between the cylinder head 2 and piston 3. The ionized air-fuel mixture produces a strong ionic wind through the openings 15a and 15b in the outer electrode 15. At this time, fuel particles spaced apart a distance ranging from several to more than ten centimers from the plug 10 are atomized under the influence of a negative D.C. voltage of 4000 to 15,000 volts on the plug 10. The negatively charged fuel particles are attracted towards the peripheral electrode 15 which is at ground potential. This occurrence has been observed in a schlieren photograph.

In order to demonstrate the manner in which the corona discharge plug 10 attracts ionized fuel particles to the electrode 15, liquid fuel was disposed on a metal plate in a puddle having a depth of 1 to 2 mm. When the plug 10 is brought near the surface of the puddle of liquid fuel on the plate and a high voltage is not impressed on the plug, there arises no change in the surface of the puddle. When a high voltage is impressed on the plug 10 when it is adjacent to puddle surface, a circular depression is formed in the liquid of the puddle opposite to the bottom opening of the peripheral electrode 15. If the plug 10 is brought still closer to the depressed liquid surface while the voltage is maintained, it has been observed that the built-up peripheral portion of the circular depression in the puddle is attracted to the peripheral electrode 15 and toward the openings 15a and 15b.

From this demonstration and schlieren photographs, it is believed that the fuel constituents of the mixture charge are negatively ionized by the use of the corona discharge at the plug 10. The fuel and air ions then flow along the lines of electric force 18 (FIG. 3) to the peripheral electrode 15. At least some of the charged liquid fuel particles are deposited on the peripheral electrode 15 under the influence of electrostatic attraction forces. The air-fuel mixture is rendered leaner due to precipitation of the fuel particles on the peripheral electrode 15. This very lean air-fuel mixture flows through the openings 15a and 15b to the outside of the plug 10.

Due to convection of the air-fuel mixture charge, the portion of the charge on the side of the combustion chamber adjacent the corona discharge plug 10 becomes relatively rich while the portion of the charge adjacent to the opposite side of the combustion chamber becomes relatively lean. Since the conventional spark plug 30 is closely ajdacent to the corona discharge plug 10, the mixture charge is stratified with a rich portion of the charge adjacent to both the spark plug 30 and the corona discharge plug 10. By the use of the peripheral electrode 15 of a truncated conical, cylindrical shape with a convergent bottom opening, the above stratifying action has been more effectively conducted.

The rich portion of the stratified air-fuel mixture is initially ignited by the spark plug 30. In accordance with a feature of the present invention, complete burning of the air-fuel mixture in the combustion chamber is promoted by utilizing the corona discharge plug 10 to provide a secondary spark. To this end, the corona discharge at the plug 10 is turned into a continuous spark discharge. The change from a corona discharge to a continuous spark at the plug 10 is accomplished automatically by the increased electroconductivity of the flames produced by ignition of the stratified charge by the spark plug 30. Thus the increased electroconductivity of burning air-fuel mixture enables the corona discharge between the electrodes 13 and 15 to change to a spark discharge.

Tests were carried out to examine the manner in which a mixture charge is attracted to a conventional spark plug, similar to the spark plug 30, and to the corona discharge plug 10. The tests were carried out according to the following procedures. First, a voltage of 3kv was applied to respective spark plugs so as to produce an electric field. Then fine fiber pieces of nylon, in place of particles of fuel, were sprayed uniformly in combustion chambers associated with the plugs. After interruption of the high voltage, the combustion chambers were opened and the manner in which the fiber pieces of nylon corresponding to particles of fuel were attracted by the electrostatic fields of the two plugs was examined.

Where the spark plug 30 of the prior art was used during the tests, a large number of pieces of nylon were attracted to the inner wall of the combustion chamber. It is believed that fuel particles are similarly attracted to the combustion chamber walls and cooled when a high voltage is applied to the spark 30 during operation of an engine. This results in incomplete combustion due to a quenching action. Of course, the quenching action results in an increased quantity of exhaust gases.

In the tests of the corona discharge plug 10, there was very little attraction of particles of nylon to the inner wall of the combustion chamber. The pieces of nylon were attracted to the peripheral electrode 15. Therefore, it is believed that the corona discharge plug 10 promotes stratification of the air-fuel mixture charge, during operation of an engine, due to collection of particles of fuel in the vicinity of the cylindrical peripheral electrode 15. It is also believed that a vortex is created due to ionic wind blowing from the center electrode 13.

In the internal combustion engine shown in FIG. 1, air and particles of fuel in the mixture charge introduced through the inlet valve 5 from the inlet port 4 are negatively ionized due to the electrostatic field from the corona discharge plug 10. The electrostatic field results in impingement among electrons at an extremely high speed, thereby producing a strong ionic wind along the lines of electric force shown in FIG. 3. The ionic wind is widely spread over the entire area within the combustion chamber, so that the particles of fuel from a major portion of the charge will be collected at the peripheral electrode 15 of the plug 10. The fuel constituents are electrostatically atomized due to a coulomb force and other physical driving force in the strong electric field produced at the discharging gap 17 between the tip portion 16 of the center electrode and the peripheral electrode 15.

The air-fuel mixture is made leaner as a result of the liquid fuel particles being electrostatically precipitated on the peripheral electrode 15. The very lean air-fuel mixture from which fuel particles have been electrostatically removed flows through the peripheral openings 15a and 15b of the peripheral electrode 15 into the combustion chamber. Thus the convection of the air-fuel mixture charge in the combustion engine is produced.

The convective action of the air-fuel mixture charge is effected throughout the duration of the suction and compression strokes of the engine. The movement of the air-fuel mixture charge in the combustion chamber is greatly promoted during the suction and compression strokes because the speed of a portion of the charge moving toward the plugs 10 and 30 is multiplied by the upward movement of the piston 3. The results in a major portion of the air-fuel mixture being exposed to the electrostatic field of the corona discharge plug 10. A rich air-fuel mixture is stratified in the vicinity of the spark plug 30 and corona discharge plug 10. An atomized and relatively lean airfuel mixture is formed in the remainder of the combustion chamber.

During an explosion stroke, a spark discharge from the main spark plug 30 fires the rich air-fuel mixture in the vicinity of main spark plug. This produces flames which are propagated towards the corona discharge plug 10 disposed closely adjacent the main spark plug 30. The flames are so high in electroconductivity that the corona discharge in the subsidiary plug 10 is short-circuited and turned into continuous pulse spark discharge. This continuous spark at the plug 10 ensures firing of the relatively lean remaining portion of the air-fuel mixture charge. The resulting explosion has a rapid speed of flame propagation which promotes complete combustion. During the exhaust stroke, the convective ionic wind effectively promotes scavenging the combustion gases. If should be noted that the corona discharge plug 10 performs the dual functions of establishing a corona discharge and of establishing a secondary ignition spark.

FIG. 2 shows another embodiment of the invention in which the corona discharge plug 10 is mounted in an auxiliary combustion chamber 60. The auxiliary combustion chamber 60 is held in the cylinder head 2 by a threaded plug. The corona discharge plug 10 is threaded into the auxiliary combustion chamber. The wall of the auxiliary combustion chamber 60 is provided with a hole 61 for passing flames from the main spark plug 60. A through-hole 62 communicating the main combustion chamber in the cylinder 1 with the auxiliary combustion chamber.

In the embodiment shown in FIG. 2, the auxiliary combustion chamber 60 is formed separately from the cylinder head 2, but may be formed integrally therewith. The function of the corona discharge plug 10 is the same as in the embodiment of FIG. 1, except that stratification of the mixture charge is effected essentially within the auxiliary combustion chamber 60. In FIG. 2, the positions of the plugs 10 and 30 may be replaced one for the other, and the main spark plug 30 may be placed in the main combustion chamber closely adjacent to the opening 62.

The high-voltage generating means 40 is constructed with a piezo-electric transformer having a high internal resistance to thereby resist short-circuiting the load during the secondary ignition. In order that a high voltage produced at the source 41 will not cause a voltage drop interference upon the discharging of electricity in respective cylinders, a high-voltage rectifier 43 and a charging and discharging high-voltage condenser 44 are provided in the voltage impressing circuit connected to the corona discharge plug 10 in FIG. 1. High-voltage rectifiers 46 and condensers 47 are incorporated in voltage impressing paths 45 connected to other cylinders, so that electricity may be fed in common to these circuits. In FIG. 2, there is a high-voltage source, whose voltage is raised by means of a winding type transformer having a low internal resistance. In this case, high-voltage resistors 48 and 49 are provided in the voltage impressing circuits connected to respective cylinders, in a manner that a current may be fed thereto, with the freedom of discharge interference in respective cylinders. In this embodiment, if a high-voltage condenser 50 is incorporated in the circuit shown by a dotted line, a strong secondary ignition discharge results.

Figure 4:
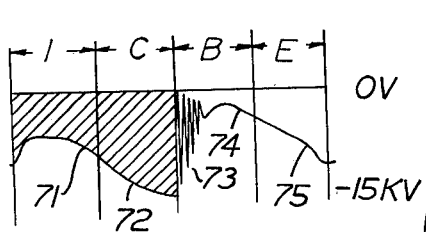
FIG. 4 is a graphical representation of the voltage impressed on the center electrode of the corona discharge plug of FIG. 3 during operation of the engines of FIGS. 1 and 2.

FIG. 4 shows the wave form of the voltage applied to the center electrode 13 of the corona discharge plug 10 during respective strokes of the four-cycle engine. Shown at I is a suction stroke, at C a compression stroke, at B an explosion stroke and at E an exhaust stroke. Because of the construction of the electric circuit of the present invention, the highvoltage impressing device 40 has more or less a voltage-dropping characteristic, and the voltage impressed varies in response to variations in electric discharging load.

In the initial stage of the suction stroke I, pressure in the cylinder is negative and radiation of electrons from the discharge portion 16 toward the peripheral electrode 15 of the plug 10 becomes vigorous. This causes the corona discharge to turn into a glow discharge. Due to the additional load of the glow discharge, the absolute value of the negative voltage applied to the central electrode 13 decreases as shown by the curve 71. As the mixture charge is introduced under pressure into the cylinder the pressure in the cylinder increases and the glow discharge is turned into corona discharge. As this occurs, the load current is minimized and the absolute value of the negative voltage increases toward the end of the intake stroke as plotted by the curve 71.

During the compression stroke C, pressure in the cylinder is increased. Therefore movement of electrons due to corona discharge is reduced. With a decrease in corona discharge load current, voltage rises as plotted by a curve 72 and the corona discharge is substantially stabilized at the normal intensity.

In the initial stage of the explosion stroke B, the mixture charge is fired by a spark at the main spark plug 30. The corona discharge at the plug 10 is short-circuited due to the relatively high electroconductivity of the flames from the main spark plug 30. Short-circuiting of the corona discharge results in a continuous pulse-form secondary spark discharge, as plotted by a curve 73. Because of this repeated spark discharge, the absolute value of the voltage drops as plotted by a curve 74. The absolute value of the voltage again rises during the exhaust stroke E, as represented by a curve 75.

Figure 5:
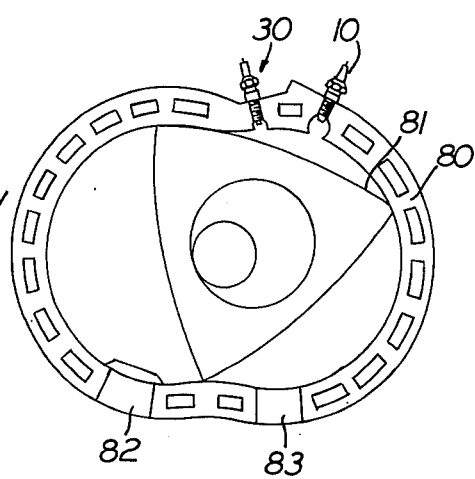
FIG. 5 is a cross sectional view of a rotary or Wankel type, internal combustion engine, in which the present invention is embodied.

FIG. 5 shows the case where the present invention is embodied in a Wankel or rotary type internal combustion engine. This engine has a trochoidal housing 80, a rotor 81, an inlet port 82 and an exhaust port 83. The main spark plug 30 is disposed in the housing on the trailing side of the rotor as viewed in the rotating direction thereof. The corona discharge plug 10 is disposed in the housing on the leading side of the rotor as viewed in the rotating direction thereof. In this engine, the corona discharge plug 10 has substantially the same in function and effects as that in the engine described. Thus providing an antipollution internal combustion engine, with reduced fuel consumption.

In the present invention, to the effect that output impedance in the high-voltage source 40 is increased, a piezoelectric transformer or resistors are incorporated in the voltage impressing circuit. This produces high-voltage regulation effects, thus preventing abnormal spark discharge in the suction stroke, backfire to the carburetor, and premature firing in the compression stroke. Furthermore, in the event that the short-circuited, periodical discharge due to electroconductivity of flames at the corona discharge plug 10 is caused upon the secondary ignition during the explosion stroke, such does not impose any burden on the high-voltage source device.

The embodiments shown are the cases where the present invention has been realized in a four-cycle engine, and the present invention may be applied to a two-cycle engine as well.

In view of the foregoing description it is apparent that a strong ionic wind is produced when a high negative D.C. voltage of 4,000 to 15,000 volts is applied to the center electrode 13 of a corona discharge plug 10. The ionic wind is promoted by forming the center electrode 13 with a stylusshaped corona discharge portion 16 surrounded by an annular outer electrode 15 having peripheral openings 15a, 15b.

The strong ionic wind and convection of the mixture charge produced by the action of the corona discharge between the center electrode 13 and peripheral electrode 15 causes a relatively large portion of an air-fuel charge introduced into the cylinder to be exposed to corona discharge. This results in the precipitation of fuel particles on the outer electrode 15 preventing production of hydrocarbons due to cooling of the fuel particles on the combustion chamber wall with a resulting quenching action.

The ionic wind also causes the mixture charge rendered leaner than the total air-fuel ratio by the electrostatic precipitation of fuel particles, to flow at a high speed in the cylinder to prevent production of hydrocarbons. Atomization of the lean mixture charge is facilitated in the cylinder by the ionic wind, thereby promoting stratification of the mixture charge and preventing production of oxides of nitrogen. In addition, combustion efficiency is enhanced with a reduction in quantity of carbon monoxide.

By disposing the corona discharge plug 10 near the main spark plug 30, the primary ignition by the main spark plug ensures the firing of the rich mixture charge produced by the corona discharge plug. The resultant flames are propagated to the corona discharge portion of the plug 10. The corona discharge is then shifted to secondary continuous spark discharge, to thereby positively fire the lean mixture charge for the explosion stroke. This results in accelerating flame propagation so that combustion efficiency is enhanced and the quantity of oxides of nitrogen and hydrocarbons is reduced.

Figure 6:
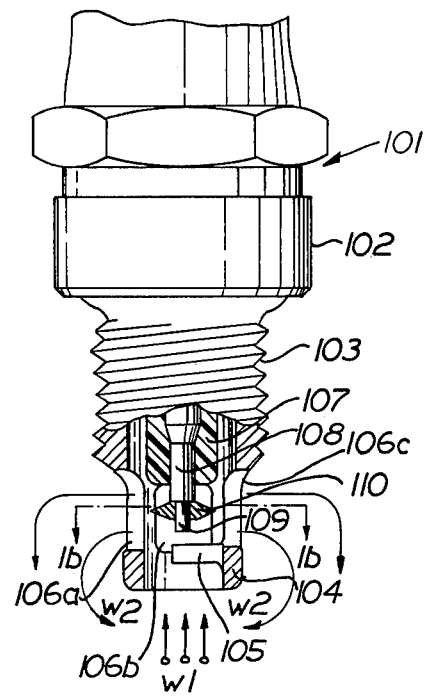
FIG. 6 is an enlarged partially broken away view of an improved corona discharge plug constructed in accordance with one feature of the present invention.
Figure 7:
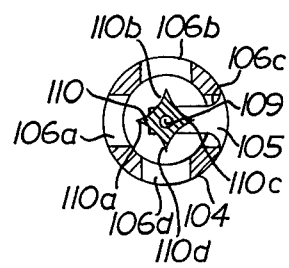
FIG. 7 is a sectional view, taken generally along the line 7—7 of FIG. 6, illustrating the configuration of projections formed on a central electrode of the corona discharge plug.

In the embodiments of the invention illustrated in FIGS. 1-5, a spark plug 30 is used in association with a separate corona discharge plug 10. In the embodiment of the invention illustrated in FIGS. 6 and 7 a combined corona discharge and spark plug assembly 101 is utilized.

The combination plug 101 is provided with an outer electrode conductor 102 (FIG. 6) and a columar central electrode conductor 108 which is secured in position within the conductor 102 and electrically insulated by an electrically-insulating material 107. These electrode conductors 102, 108 are made of a metal.

The outer electrode conductor 102 is formed with a threaded portion 103 and a tip portion which is formed so as to provide a cylindrical outer electrode 104 having four holes 106a to 106d disposed at an angular spacing of 90°. The aforesaid holes 106a to 106d correspond to the openings 15a, 15b of FIG. 3 and permit the passing of an air-fuel mixture therthrough.

A tip portion 109 of the center electrode conductor 108 defines a spark gap with that portion of the outer electrode 104 which projects internally and radially thereof, i.e., a spark-discharging outer electrode 105. A conductor member 110 of a rectangular star-shape forms a part of the center electrode 108 together with the tip portion 109. The conductor member 110 is formed with projections 110a to 110d which project radially outwardly of the tip portion 109 in the direction perpendicular to the axis thereof. The projections 110a to 110d are disposed at an angular spacing of 90° to one another. The tips of the projections 110a to 110d are aligned with the center of the through-holes 106a to 106d, respectively.

The projections 110a to 110d cooperate with the outer electrode 104 to define corona-discharge gaps between the wall portion of the electrode 104 and the tips of the projections. It should be noted that four corona discharge gaps are formed in association with each of the tips 110a to 110d. Thus, corona discharge gaps are formed between the tip 110a and the four sides (FIG. 7) of the opening 106a. Similarly, corona discharge gaps are formed between the tips 110b, 110c and 110d and the four sides of the associated one of the openings 106b, 106c and 106d.

Electrostatic fields are established in the aforesaid corona-discharge gaps. This results in a relatively dense electrostatic field at each of the openings 106a and 106d. The center electrode consisting of the tip portion 109 and starshaped conductor member 110 is surrounded by the outer electrode 104 of a cylindrical shape. The member 110 is fitted on the tip portion 109. However, the member 110 may be formed integrally with the tip portion 109. In addition, the projections 110a to 110d and through-holes 106a to 106d are provided, in this instance, as being four in number, while this should not be construed in a limitative sense.

With the spark plug 101 of the aforesaid arrangement, a negative voltage of 4,000 to 20,000 volts is impressed from a high voltage source, similar to the voltage source 40 of FIG. 1 on the center electrode 108 in overlapping relation to the ordinary spark-current. Accordingly, there are established corona discharges at the tips 110a to 110d of the star-shaped member 110. Electrons are attracted to the molecules of air components which have been produced according to the corona discharge, so that the aforesaid molecules are turned into negative ions. Due to the aforesaid ions, the fuel particles within the air-fuel mixture in a cylinder are charged negatively and move toward the outer electrode 104 of a ground potential and collect thereon in the manner previously explained in connection with FIGS. 1-5.

The charged fuel particles coming toward the star-shaped member 110 are atomized according to the electrostatic atomization effect. The charge fuel particles rapidly move away accordance to the electric field in the respective directions of the projections 110a to 110d through the through-holes 106a to 106d facing the outer electrode 104 but outwardly in the radial direction from the plug creating a strong ionic wind as previously explained in connection with FIG. 1–5. The arrows $W_1$, $W_2$ indicate the movements of a mixture or fuel particles. The direction of the aforesaid movements may be reversed by modifying the dimensions and arrangement of the through-holes and an opening, as required. The flow of the mixture in a manner described promotes the inflow of a mixture of air-fuel through the central opening toward the center electrode 104, so that there is established a convection of a mixture within the combustion chamber.

Figure 8:
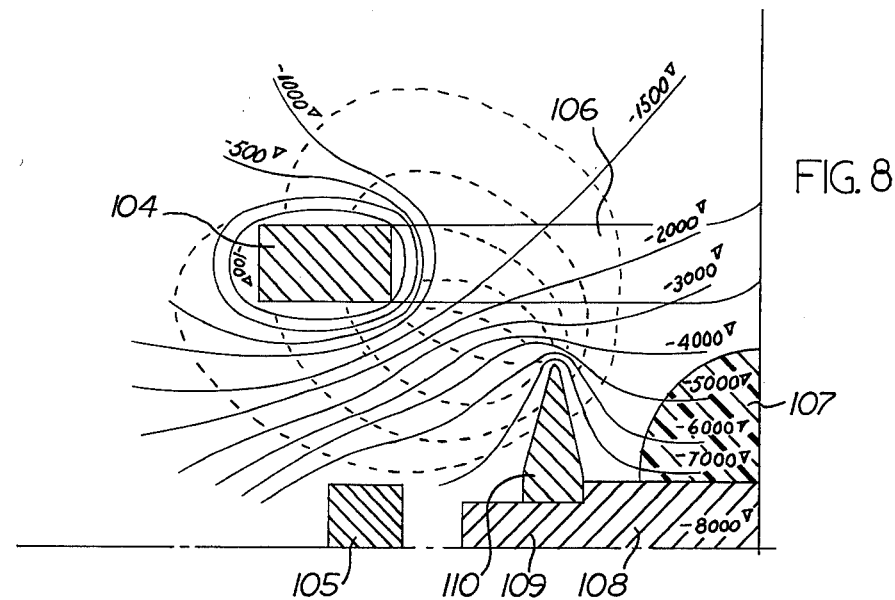
FIG. 8 is an enlarged schematized sectional view illustrating the electrical potential distribution between the corona discharge electrodes of a plug constructed according to the present invention.

FIG. 8 shows a potential distribution which has been obtained by using a computer, based on the geometric data of the aforesaid plug, with a negative voltage of $-800$ V impressed on the center electrode. In this diagram, a solid line designates an equipotential line, while a broken line designates an electric field distribution or an electric line of force. The reference numerals shown denote the same parts as those shown in FIG. 6. The reference numeral 106 designates throughholes 106a to 106d.

The intensity and direction of an electrostatic field at a given point in the electric field depends on the gradient of the potential at that point. In this embodiment, the electrostatic field is $-10^8$ V/m around the tips of the corona of the center high voltage electrode 108, and $-10^5$ V/m in the neighborhood of the outer electrode 104. The nominal field in the mid space between the electrodes is well above the corona breakdown threshold ($3 \times 10^6$ V/m). However, the corona is induced as has been proved by the test, and the corona breakdown intensity of the gases within the cylinder ranges from $10^6$ to $10^7$ V/m in the compression cycle. The corona exists over the entire compression cycle. The charged fuel particles are accelerated radially outwardly of the plug in the electric-field distributed as shown in FIG. 2.

Meanwhile, the effectiveness of the corona-discharge electrode for the condensation of gasoline fuel and stratification of a mixture, within a combustion chamber, is the function of the composite effect of the electrostatic process, hydrodynamic process and heat transmission process. FIG. 9 shows the velocity of the charged fuel particles being accelerated in the electrostatic field of $1.68 \times 10^6$ V/m. A curve 111 denotes the velocities of particles of $10\mu$ in diameter, while a curve 112 denotes the velocities of fuel particles of $100\mu$ in diameter.

Figure 10:
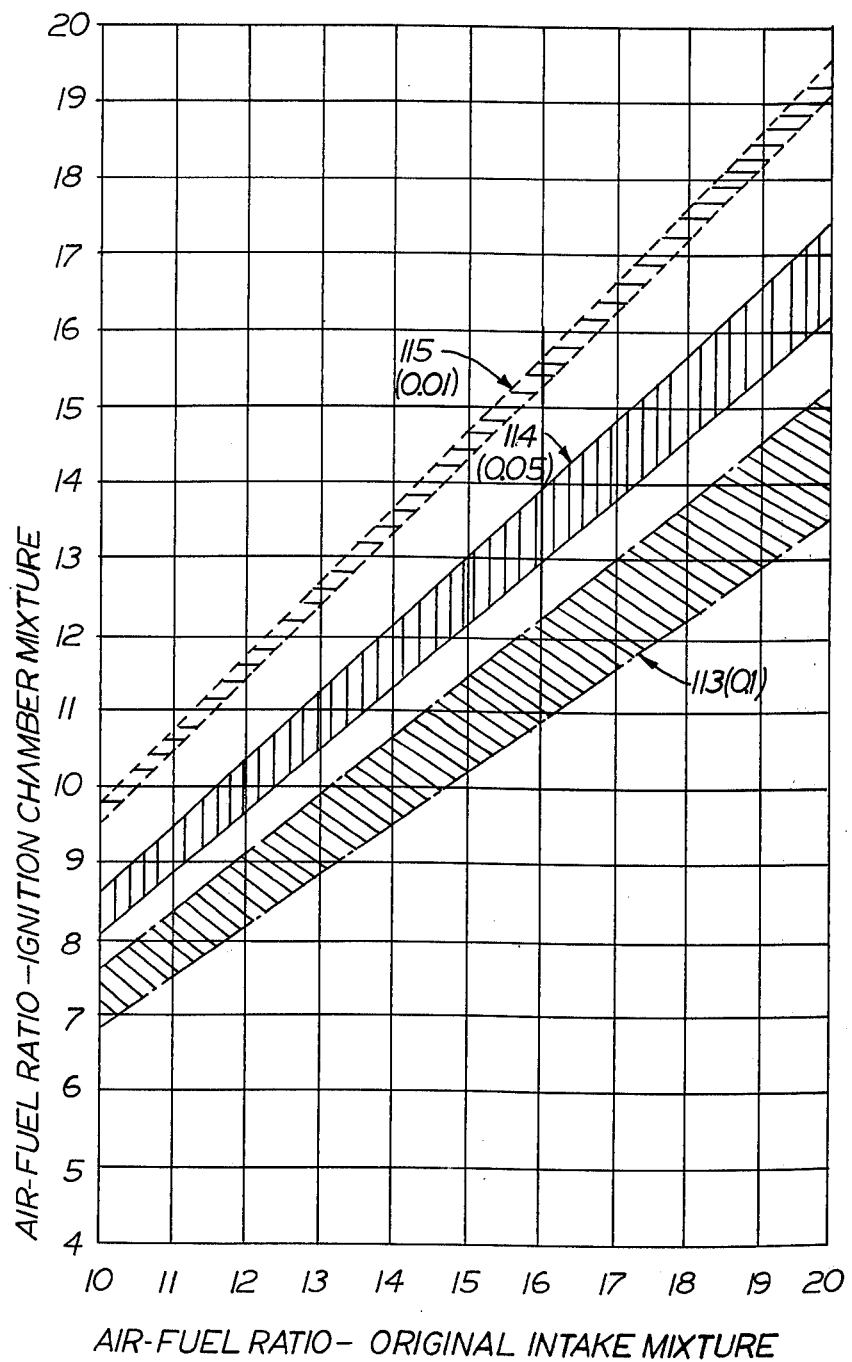
FIG. 10 is a graph showing the relationship between the air-fuel ratio of a mixture supplied to an engine and the air-fuel ratio of the mixture within the main combustion chamber when different quantities of fuel are electrostatically attracted by the corona discharge plug.

Curves 113, 114, 115 in FIG. 10 represent the relationship of the air-fuel ratio of an intake mixture to the air-fuel ratio of a mixture in the combustion chamber, in cases where the ratios of the total intake mixture to the amounts of an intake mixture used in the corona field are 0.1, 0.05 and 0.01, respectively. Many assumptions were made to obtain the results shown in FIGS. 9 and 10. However, these results have been proved to be correct theoretically. These data prove the possibility of the stratification of an intake mixture within the combustion chamber, when using a spark plug according to the invention. This has been proved to be effective by the tests. The present invention is directed to improving the effect of the aforesaid stratification, and the particular configuration and arrangement of a spark plug are determined from the aforesaid viewpoints.

Figure 11:
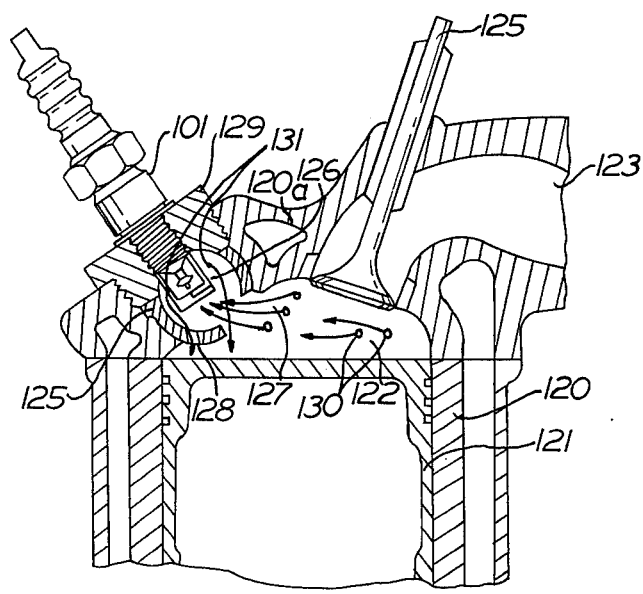
FIG. 11 is a fragmentary sectional view of a cylinder of an internal combustion engine illustrating the relationship of an improved auxiliary combustion chamber to the corona discharge plug of FIG. 6.
Figure 12:
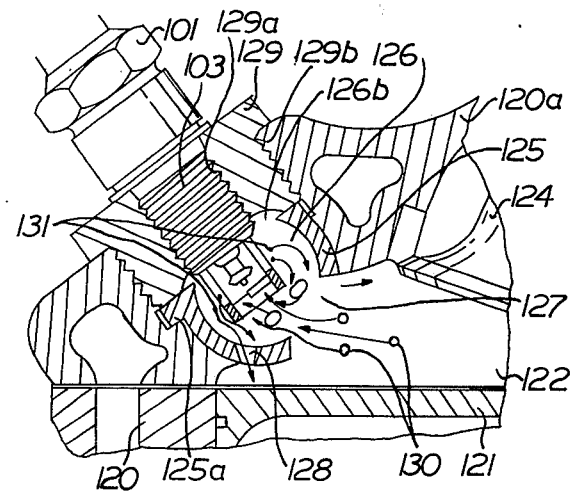
FIG. 12 is an enlarged sectional view of a portion of FIG. 6.

FIGS. 11 and 12 exemplify the four-cycle engine, in which one embodiment of the invention using the aforesaid plug 101 is practiced. In these figures, a piston 121 is disposed within a cylinder in a movable manner therein. A cylinder head 120a is provided with an intake port 123, in which an intake valve is located, and with an auxiliary chamber 126, which communicates by way of a communicating hole 127 with a main combustion chamber 122. In addition, a plug 101 is mounted on the head 120a, with the discharging portion of the plug positioned within the auxiliary combustion chamber 126.

The auxiliary combustion chamber is defined by a spherical member 125 having a spherical inner wall which surrounds the discharging portion of the plug 101. A communicating hole 127 which is directed towards the intake valve 124 is provided in the bottom portion of the member 125 and communicates with the main combustion chamber 122. If desired, an auxiliary communicating hole 128 may be provided separately from the communicating hole 127 first referred to so as to bleed the mixture from the auxiliary combustion chamber 126 into the main combustion chamber 122.

An opening 126a (FIG. 13) is defined in the upper portion of the spherical member 125 for receiving the discharging portion of the spark plug therein. A circular position-aligning flange 125a is formed on the wall portion of the opening 26a and has its center in the position offset from the center of the aforesaid opening 126a. A plug-attaching member 129 (FIG. 11) is formed with an inner peripheral thread 129a which meshes with the threaded portion 103 of the plug 101, and with an outer peripheral thread 129b which meshes with the threaded inner wall of the attaching hole provided in the head 129a. The spherical member 125 is first fitted on the plug-attaching member 120a by using the flange 125a, and then the plug-attaching member 129 is secured to the head 120a.

Alternatively, the auxiliary combustion chamber 126 may be provided integrally with the head 120a. However, the provision of the removable type spherical member 125 as described in the aforesaid embodiment permits ready manufacture, repair and modification of the auxiliary combustion chamber.

As shown, the discharging portion of the spark plug 101 (more specifically, the spark-discharge gap and corona-discharge gap) is offset in a direction away from the communicating hole 127. This promotes the convection effect of a mixture within the auxiliary combustion chamber 126, as will be described in more detail.

Referring to FIGS. 11 and 12, the fuel particles 130 of relatively large sizes flow from the main combustion chamber 122 by way of the communicating hole 127 into the auxiliary combustion chamber 126. The aforesaid flow of the fuel particles takes place continuously throughout the suction and compression strokes. Particles 130 flow into the corona discharge gaps defined between the electrodes in the axial direction of the plug according to a unique arrangement of the electrodes of the plug 101. The fuel particles are then electrostatically charged in the aforesaid gaps, accelerated and discharged through the through-holes 106a to 106d in the radially outward direction therefrom.

At this time, the fuel particles 130 have been atomized according to the electrostatic atomization-effect and thus turned into relatively small particles 131. The particles 131 are directed as shown by arrows along the inner wall surface of the auxiliary combustion chamber 126 into the communicating hole 127 or into an auxiliary communicating hole 128, and then into the main combustion chamber. In this manner, the convection of a mixture takes place within the auxiliary combustion chamber 126, so that the inflow of a mixture from the main combustion chamber 122 into the auxiliary combustion chamber 126 may be promoted. This promotes the collection of fuel particles on the outer electrode 104 of the plug 101 as well as the atomization of the mixture. This in turn leads to the promotion of the stratification of the mixture between the combustion chambers. As is apparent from the foregoing, a higher concentration of fuel is achieved in the central portion of the auxiliary combustion chamber 126, as compared with that of a mixture prevailing in its peripheral portion.

Figure 13:
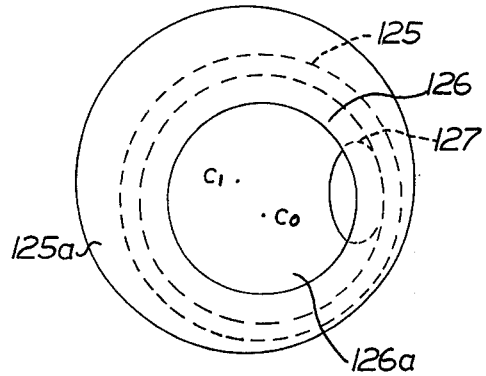
FIG. 13 is an enlarged plan view, taken generally along the line 13—13 of FIG. 12, illustrating the construction of the modified form of the auxiliary combustion chamber.
Figure 14:
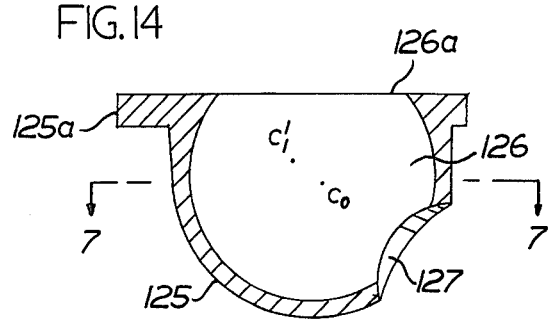
FIG. 14 is a sectional view taken generally along the line 14—14 of FIG. 13, further illustrating the construction of the auxiliary combustion chamber.
Figure 15:
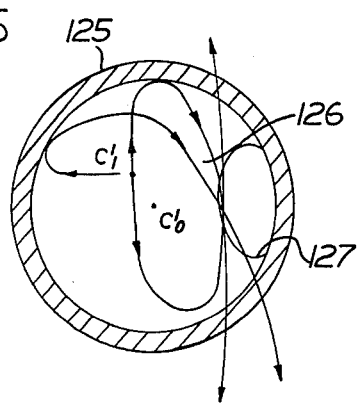
FIG. 15 is a sectional view, taken generally along the line 15—15 of FIG. 14, schematically illustrating the flow path of an air-fuel mixture after fuel particles have been electrostatically precipitated from the mixture in the auxiliary combustion chamber.

FIGS. 13, 14 and 15 show still further examples of the spherical member 125 defining the auxiliary combustion chamber. The spherical members shown are similar in construction to the spherical member shown earlier, except for the lack of the auxiliary communicating hole 128. As shown in FIG. 13, the spherical member 125 having a communicating hole 127 in its bottom portion is formed with a position-aligning flange 125a having its center Cl offset from the center Co of the upper opening 26a. The spark plug is positioned in the axial alignment with the center Cl of the flange 25a, while the discharging portion of the spark plug is positioned in the position C'l (FIG. 14) which is offset from the center C'o of the inner spherical wall surface of the auxiliary combustion chamber 126 in the direction away from the communicating hole 127.

According to the aforesaid arrangement of the discharging portion of the plug 101 and the communicating hole 127 of the auxiliary combustion chamber 126, the jet streams of a relatively lean mixture from which fuel particles have to be electrostatically precipitated, are directed in four directions. Thus, the air-fuel mixture is accelerated through the corona discharge gap in the plug 101, as shown by arrows, and directed against the inner wall of the auxiliary combustion chamber 126 at a location offset upwardly of the center C'o of the auxiliary combustion chamber and located away from the communicating hole 127. This results in a convection path extending the long way around the auxiliary combustion chamber 126 before entering the communicating hole 127. This permits the maximum amount of a mixture to be admitted into the auxiliary combustion chamber 126 by way of the communicating hole 127. As a result of this convection, the stratification of the mixture is further improved.

Figure 16:
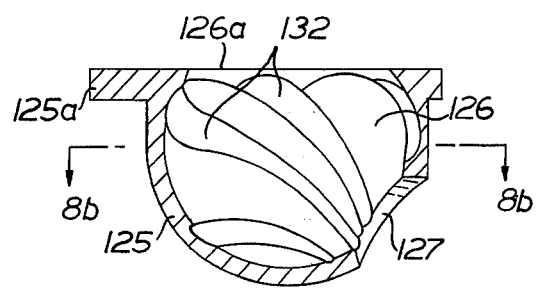
FIG. 16 is a sectional view, generally similar to FIG. 14, of an embodiment of the auxiliary combustion chamber in which arcuate grooves are formed on the inside wall of the combustion chamber to direct the flow of the extremely lean air-fuel mixture.
Figure 17:
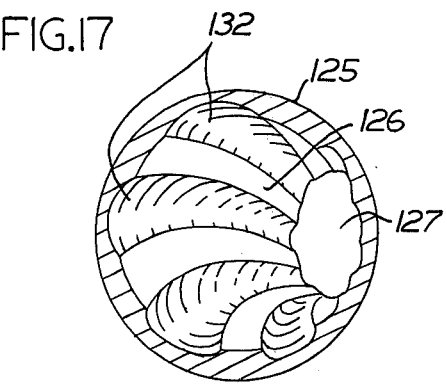
FIG. 17 is a plan view, taken generally along the line 17—17 of FIG. 16, further illustrating the construction of the auxiliary combustion chamber.

FIGS. 16 and 17 show examples of the auxiliary combustion chamber 126 having a plurality of spiral grooves 132 in its inner wall. The arcuately curving grooves direct the flow of the air-fuel mixture toward the opening 127. By directing the flow of the air-fuel mixture with the grooves 132, convection with the auxiliary combustion chamber 126 is improved with a resulting improvement in the flow of the air-fuel mixture to and from the auxiliary combustion chamber.

Figure 18:
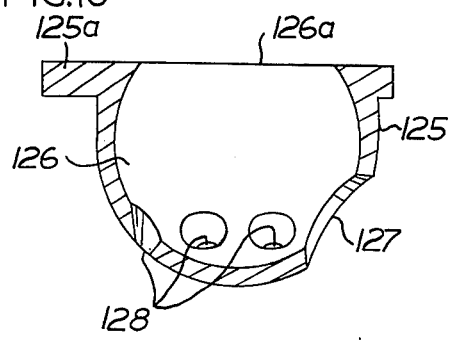
FIG. 18 is a sectional view of the auxiliary combustion chamber shown in FIGS. 11 and 12 and illustrating the relationship of secondary air-fuel mixture flow openings to a main air-fuel mixture flow opening.

FIG. 18 shows an example of the auxiliary combustion chamber having a plurality of auxiliary communicating holes 128. The holes 128 enable the atomized and accelerated mixture to flow from the auxiliary combustion chamber 126 to the main combustion chamber 122. Thus, the air-fuel mixture from which particles of fuel have been electrostatically precipitated, flows under ionic wind effects along the spherical inner wall surface of the auxiliary combustion chamber 126 through the openings 128 into the main combustion chamber before reaching the opening 127. Of course, this facilitates a flow of the air-fuel mixture from the main combustion chamber 122 through the opening 127 into the auxiliary combustion chamber 120.

The spherical members 125 shown in FIGS. 13 to 18 may be used in place of the spherical member 125 illustrated in FIGS. 11 and 12. In addition, the auxiliary combustion chambers of FIGS. 11-15 and 18 could be provided with arcuate grooves 132 as shown in FIGS. 16 and 17.

As is apparent from the foregoing, the principle incorporated in the present invention may be applied not only to a four-cycle engine but also to a two-cycle engine.

When the air-fuel ratio of an intake mixture to the main combustion chamber 122 is 18:1, there may be obtained a rich mixture having an air-fuel ratio on the order of 14:1 to 16:1, in the neighborhood of the corona discharge in the auxiliary combustion chamber 126. For this reason, such a rich mixture may be ignited positively by the spark discharge emanating between the electrode 5 and the tip 9 of the central electrode 8. The flame created by explosion within the auxiliary combustion chamber brings about ideal combustion and explosion of the lean mixture reaching the main combustion chamber 122 by way of the communicating hole 127.

The lean mixture which is ignited in the main combustion chamber 122 has been discharged from the auxiliary combustion chamber 126 and atomized prior to explosion. The lean mixture in the main combustion chamber has been further atomized and rendered susceptible to combustion, as compared with the mixture which has been introduced initially at an air-fuel ratio of 18:1. Due to the electrostatic precipitation of fuel particles on the outer electrode 104, air-fuel mixture in the main combustion chamber is very lean and has an air-fuel ratio of 20:1 to 22:1. Accordingly, there takes place a combustion approximating complete combustion within the main combustion chamber 122, thus reducing the concentration of the toxic gas components contained in exhaust gases.

As is apparent from the foregoing description, the engine according to the present invention may effect the stratification of a mixture according to the convection of the mixture, even if the mixture being supplied is so lean as to provide an air-fuel ratio on the order of 18:1 to 22:1, so that the concentrations of the toxic components such as NOx (nitrogen oxides), HC (hydrocarbon) and CO (carbon monoxide) and the like, which are contained in exhaust bases from an engine, may be reduced, and hence such an engine is quite advantageous from viewpoints of the prevention of the air pollution.

The embodiments of the invention in which an exclusive property or privilege is claimed are defined as follows:

1. A method of igniting a air-fuel mixture charge in an engine, said method comprising the steps of introducing a charge of air-fuel mixture into a combustion area in the engine, establishing a corona discharge between electrodes of a first plug to effect an electrostatic stratification of the air-fuel mixture charge into a rich portion adjacent to the first plug and a lean portion spaced apart from the first plug, establishing a spark between electrodes of a second plug disposed adjacent to the first plug to effect ignition of the rich portion of the charge, and thereafter establishing a spark discharge between the same electrodes of the first plug as were utilized in the establishment of the corona discharge to promote ignition of the relatively lean portion of the charge.

2. A method as set forth in claim 1 wherein said combustion area includes a main combustion chamber into which the charge of the air-fuel mixture is introduced and an auxiliary combustion chamber connected in fluid communication with the main combustion chamber, said step of establishing a corona discharge including the step of establishing a corona discharge in the auxiliary combustion chamber, said step of establishing a spark between electrodes of a second plug including the step of establishing a spark in the auxiliary combustion chamber.

3. A method as set forth in claim 1 wherein the charge of air-fuel mixture is introduced into a main combustion chamber of an engine, said step of establishing a corona discharge including the step of establishing a corona discharge in the main combustion chamber, said step of establishing a spark between electrodes of a second plug including the step of establishing a spark in the main combustion chamber.

4. A method as set forth in claim 1 wherein said step of establishing a spark discharge between the electrodes of said first plug includes the step of changing the corona discharge between the electrodes of the first plug to a spark discharge by increasing the electroconductivity of a spaced between the electrodes of the first plug with flames produced as a result of igniting the air-fuel mixture with a spark at the second plug.

5. In a method for ignition a lean mixture charge fed to a combustion chamber in a cylinder by means of a main spark plug and a subsidiary plug having a center electrode and a cylindrical peripheral electrode surrounding said center electrode; the improvements comprising the steps of;
impressing a D.C. high voltage on a center electrode of said subsidiary plug thereby causing a corona discharge at the tip of said center electrode;
producing an electric field in a portion between said center electrode and said peripheral electrode, thereby collecting atomized droplets of fuel contained in a lean mixture charge fed to the combustion chamber in the cylinder, thus preparing an ignitable mixture charge;
igniting the ignitable mixture charge thus prepared, by means of spark produced at said main spark plug; and
turning said corona discharge into a spark discharge due to the electroconductivity of flames produced by igniting said mixture charge.

6. The improvements as defined in claim 5, wherein said main spark plug and subsidiary spark plug are provided in a subsidiary combustion chamber for igniting a mixture charge.

7. A method of igniting a air-fuel mixture charge in an engine, said method comprising the steps of introducing a charge of air-fuel mixture into a combustion area in the engine, establishing a corona discharge between electrodes of a first plug to effect an electrostatic stratification of the air-fuel mixture charge into a rich portion adjacent to the first plug and a lean portion spaced apart from the first plug, establishing a spark between electrodes of a second plug disposed adjacent to the first plug to effect ignition of the rich portion of the charge, said step of establishing a spark between the electrodes of a second plug being performed after electrostatic stratification of the air-fuel mixture by the corona discharge at the first plug, and thereafter establishing a spark discharge between the same electrodes of the first plug as were utilized in the establishment of the corona discharge to promote ignition of the relatively lean portion of the charge, said step of establishing a spark discharge between the electrodes of said first plug including the step of changing the corona discharge between the electrodes of the first plug to a spark discharge by increasing the electroconductivity of a space between the electrodes of the first plug with flames produced as a result of igniting the air-fuel mixture with a spark at the second plug.

8. A method of igniting an air-fuel charge in an engine, said method comprising the steps of providing a main combustion chamber, providing an auxiliary combustion chamber connected in fluid communication with said main combustion chamber, introducing an air-fuel mixture charge into the main combustion chamber, establishing an electrostatic field between electrodes of a first plug in the auxiliary combustion chamber to promote a flow of at least a portion of the air-fuel mixture from said main combustion chamber into said auxiliary combustion chamber, electrostatically precipitating fuel particles from the air-fuel mixture in the auxiliary combustion chamber under the influence of the electrostatic field established between the electrodes of the first plug, and establishing a spark in the auxiliary combustion chamber between electrodes of a second plug to ignite the air-fuel mixture in the auxiliary combustion chamber, said step of establishing a spark in the auxiliary combustion chamber being performed after performance of said step of electrostatically precipitating fuel particles.

* * * * *